United States Patent [19]

O'Connor

[11] Patent Number: 5,905,902
[45] Date of Patent: *May 18, 1999

[54] PROGRAMMABLE STATE MACHINE EMPLOYING A CACHE-LIKE ARRANGEMENT

[75] Inventor: Dennis O'Connor, Chandler, Ariz.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/537,155

[22] Filed: Sep. 28, 1995

[51] Int. Cl.$^6$ ........................................ G06F 13/00
[52] U.S. Cl. ........................................ 395/800.01; 711/118
[58] Field of Search ................. 395/800.01; 711/100, 711/200, 118, 128

[56] References Cited

U.S. PATENT DOCUMENTS

| | | | |
|---|---|---|---|
| 4,858,102 | 8/1989 | Lovrenich | 364/136 |
| 5,280,595 | 1/1994 | Lemay et al. | 395/421.1 |
| 5,301,100 | 4/1994 | Wagner | 364/140.02 |
| 5,353,426 | 10/1994 | Patel et al. | 395/445 |
| 5,377,123 | 12/1994 | Hyman | 364/489 |
| 5,386,518 | 1/1995 | Reagle et al. | 395/310 |
| 5,473,531 | 12/1995 | Flora-Holmquist et al. | 364/141 |
| 5,483,539 | 1/1996 | Kaufmann | 370/509 |

OTHER PUBLICATIONS

Intel, *Cache Tutorial*, Intel Corporation, 1991, pp. 1–1 to 1–4, 1991.

*Primary Examiner*—Meng-Ai T. An
*Assistant Examiner*—Walter D. Davis, Jr.
*Attorney, Agent, or Firm*—Blakely, Sokoloff, Taylor & Zafman LLP

[57] ABSTRACT

The programmable state machine includes a tag entry array and a new state array. All permissible combinations of current states and input values are represented within the tag entry array. The corresponding new state, to be transitioned to for each combination of current states and input values, is stored in the new state array. The tag entry array receives the current state and the input signals and generates a hit signal identifying which of the tag entries corresponds to the current state and input value signals. The new state array outputs the corresponding new state, based upon the hit signal received. In one embodiment, the tag entry array is configured as a fully associative cache tag entry array. In another embodiment, the tag entry array is configured as a set associative cache array. To eliminate the need to redundantly store a single new state, that corresponds to a large number of different transitions, a compare under mask arrangement is provided. As an alternative, a default new state arrangement is provided which outputs a default new state if a miss is detected within the tag entry array.

24 Claims, 7 Drawing Sheets

PROGRAMMABLE STATE MACHINE EMPLOYING A CACHE-LIKE ARRANGEMENT

BACKGROUND OF THE INVENTION

1. Field of the Invention

The invention generally relates to state machines and in particular to a programmable state machine for use within the integrated circuits and the like.

2. Description of the Related Art

State machines are commonly employed in computer and electrical systems for storing information representing the state of a system and for outputting a new state based upon the current state and any input signals received. For example, within computer systems, state machines are often employed in connection with bus systems where the state machine facilitates communication over the bus, particularly by coordinating "hand-shaking" protocols and the like. State machines, however, are also employed in such diverse systems as traffic lights, elevators, etc.

Figure 1:
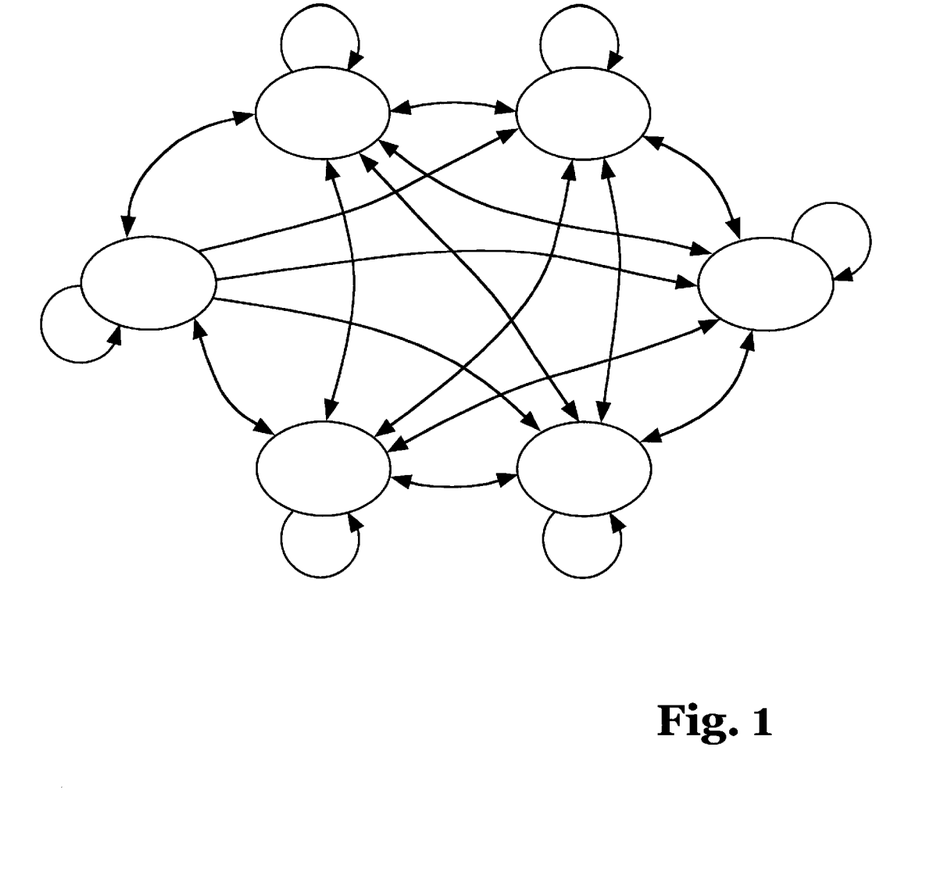
FIG. 1 is a state illustration of a generic system.

FIG. 1 illustrates a generalized six-state system wherein a transition may occur from each individual state back to itself and to every other state. Accordingly, a total of 36 transitions are possible. In general, for a system having N states, a total of $N^2$ transitions are possible.

Conventionally, combinatorial logic is employed to implement the state machine. The combinatorial logic is configured to output a new state value based upon the current state and any input signals received.

A disadvantage of employing combinatorial logic to represent a state machine is that the state machine, once designed and fabricated, cannot be changed. Hence, if any states are added or removed or any state transitions are changed, a new state machine must be designed and fabricated employing different combinatorial logic. This is particularly a problem in computer system technology which may be need to be upgraded frequently to accommodate new peripheral systems. For example, state machines implementing bus protocols may need to be modified to accommodate new bus protocols.

Accordingly, it would be desirable to provide a programmable state machine which can be programmed, and subsequently reprogrammed, to represent any of a variety of possible systems. With a programmable state machine, if the system represented by the state machine changes, the state machine is merely reprogrammed to account for the changes, without requiring redesign and refabrication of any combinatorial logic circuitry.

Figure 2:
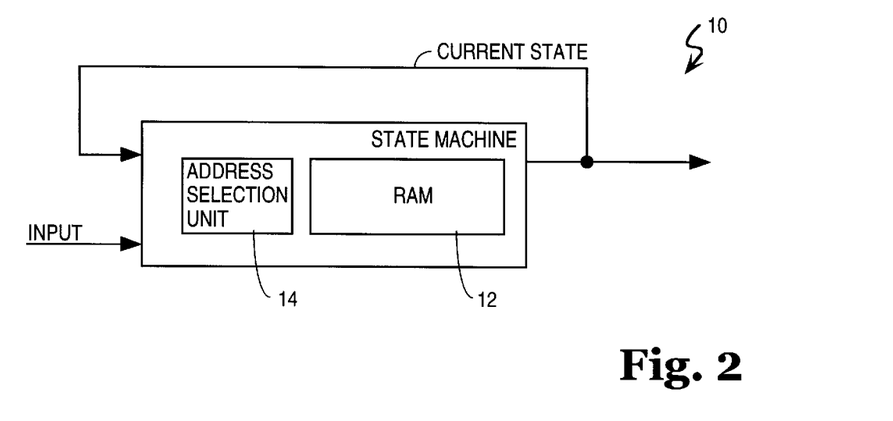
FIG. 2 is a block diagram of a programmable state machine employing a RAM.

One proposed implementation for a programmable state machine, illustrated in FIG. 2, employs random access memory (RAM) to represent the overall system. More specifically, FIG. 2 illustrates a state machine 10 having a RAM 12 and an address selection unit 14. The address selection unit receives input signals and signals representing the current state of the system and, based upon that information, determines the address of an entry within RAM 12 storing the corresponding new state.

Figure 3:
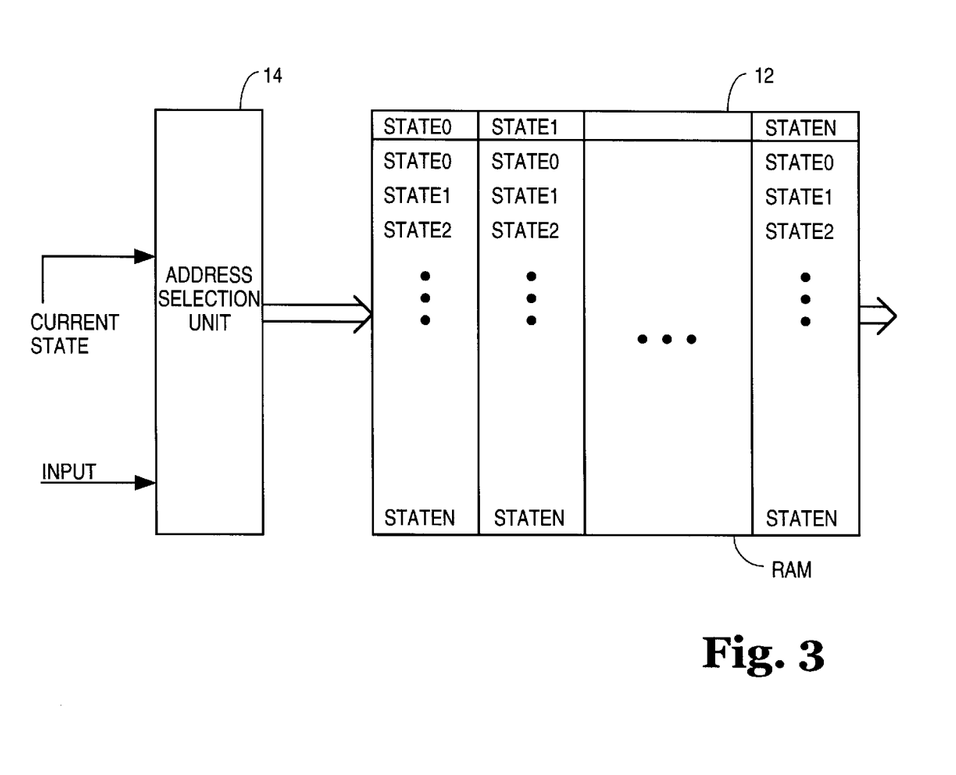
FIG. 3 is a block diagram of a portion of the state machine of FIG. 2.

FIG. 3 illustrates RAM 12 in greater detail. RAM 12 has one column of storage locations for each current state of the system and one element, within each column, for every possible new state into which the system may transition based upon the current state and the input signals. Hence, for a system having N states, the RAM maintains $N^2$ entries. In use, the address selection unit determines the address of the new state then controls the RAM to output the new state. The overall state machine may be reprogrammed by modifying the contents of RAM 12.

Although the RAM programmable state machine of FIGS. 2 and 3 provides the flexibility of reprogramming for any possible new system (having up to a maximum predetermined number of states N), such is achieved at the expense of requiring considerable memory space. For example, if N is large, e.g., 64, 128 or 256, the amount of memory space required may become prohibitive or unduly expensive. As a more specific example, if the programmable state machine is intended to allow up to 64 states and to test up to 6 independent input conditions simultaneously, the RAM must be capable of storing 4096 entries. If 6 possible independent outputs are required, the RAM must store 12 bits per entry, for a total size of 6144 bytes. Such may be prohibitively large, particularly if the state machine is intended only as one single component of a complex micro-controller or microprocessor.

Figure 4:
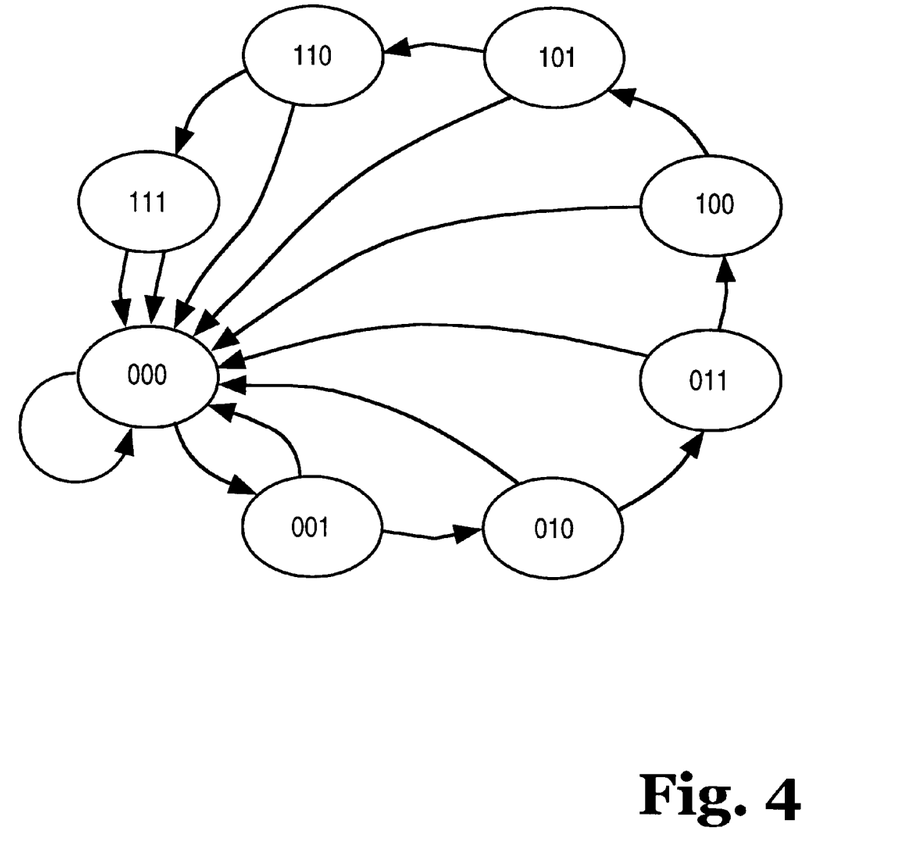
FIG. 4 is a state diagram illustrating a 3-bit counter.

The large amount of memory is required, in part, because the programmable RAM state machine is configured to account for every possible transition between every possible state. In practical systems, however, only a fraction of the total number of possible transitions can actually occur. In other words, practical systems do not typically conform to the generalized state diagram of FIG. 1. FIG. 4 illustrates a practical system, a 3-bit counter, which includes 8 states representing numbers 0–7. In the system of FIG. 4, only two general types of transitions occur. Either the system transitions to a next higher state as part of a normal count or the system transitions back to the default state of 000 in response to a reset signal. Hence, only a total of 16 transitions are permissible, rather than the 64 transitions theoretically possible.

Hence, if represented using the RAM programmable state machine of FIGS. 2 and 3, the system of FIG. 4 would require a 64 entry RAM wherein most of the entries are empty because the corresponding transition cannot occur. Moreover, many of the entries will be repeated or redundant. For example, all transitions occurring as a result of a reset input signal specify the same state "000".

It would be desirable to provide an improved programmable state machine which requires less memory space than a RAM-programmable state machine for use with practical systems which do not involve the maximum number of possible transitions and which more efficiently accounts for any redundant states, such as those occurring following reception of a reset signal. It is to these ends and aspects of the present invention are drawn.

SUMMARY OF THE INVENTION

In accordance with the invention, an improved programmable state machine is provided which requires minimal memory by employing a cache-like arrangement for the state machine. In one embodiment, the programmable state machine outputs a new state in response to a current state and input signals. The state machine includes a tag array having a tag entry for each possible combination of current states and input signals and a new state array for storing a new state corresponding to each element of the tag array. The state array is configured to output a new state in response to a hit signal received from the tag array identifying one of the elements of the tag array for which the current state and input signals match.

Hence, the programmable state machine of the invention stores only actual allowable or permissible transitions and the new states corresponding to those transitions. Transitions which are not permissible, and the corresponding new states, are not stored, resulting in a significant savings of total required memory space. For example, for an 8-state system representing a 3-bit counter, the programmable state machine of the invention stores only 16 entries corresponding to 16 permissible state transitions. Such represents a significant improvement over RAM-programmable state machines which store 64 entries covering all permissible and impermissible transitions.

In the exemplary embodiment, means are also provided for reprogramming the state machine by selectively modifying the values stored in the tag array and in the new state array. In one specific embodiment, reprogramming is achieved by employing flash programmable memory cells. Also, to allow the state machine to be reprogrammed to correspond to a variety of possible systems, the tag array and new state array are preferably provided with a sufficient number of entries to accommodate all possible transitions within anticipated systems. For example, if the programmable state machine is expected to be employed in connection with systems having no more than N states, the tag array and new state array may be configured with M entries where M is about 4N or 5N, as practical systems rarely have more than 4 or 5 transitions per state. For example, if no more than 64 states are anticipated, the tag array and new state array are provided with about 250 or 300 entries to accommodate any foreseeable practical system. Such represents a significant memory savings over the 4096 entries required using a RAM-programmable state machine.

As noted, the programmable state machine of the invention employs a cache-like circuit arrangement. The state machine may be configured in accordance with any of a variety of cache-equivalent configurations, such as fully associative caches and N-way set-associative caches. Also, to achieve an even greater economy of memory space, the state machine may be configured to employ a mask for representing redundant new states, such as reset states or "don't care" conditions. In yet another embodiment, the state machine accommodates redundant new state information by employing a "default state". More specifically, the state machine is configured to output a default state as a new state if no hit signal is generated by the tag array. As an example, the default state may represent a reset state, transitioned to by any other state in response to a reset signal, to thereby eliminate the need to store all possible reset transitions within the tag array and within the new state array. Hence, even further economy of memory is achieved.

Thus, the invention provides a programmable state machine configured with cache-like circuitry to limit the total amount of memory required while also remaining sufficiently flexible to be reprogrammed to accommodate any of the variety of alternative systems. Accordingly, the broad objective mentioned above is achieved. Other objects, as well as other advantages and features of the invention, will be apparent from the detailed description which follows and from the drawings attached hereto.

DETAILED DESCRIPTION OF EXEMPLARY EMBODIMENT OF THE INVENTION

Referring to FIGS. 5–9, exemplary embodiments of the invention will now be described. The exemplary embodiments are primarily described with reference to block diagrams illustrating primary components of the programmable state machine of the invention. For the most part, the details of the internal configuration and fabrication of each of the components will not be set forth herein. Rather, these components may be otherwise conventional or may be easily designed or fabricated in accordance with the teachings provided herein. It should be understood that some components of a practical system incorporating the invention, which are not necessary for an understanding of the operation of the invention, are not illustrated and will not be described. Also, herein, the apparatus element corresponding to each individual block may be referred to as a means for, an element for, or a unit or performing the functions described in connection with the block.

Figure 5:
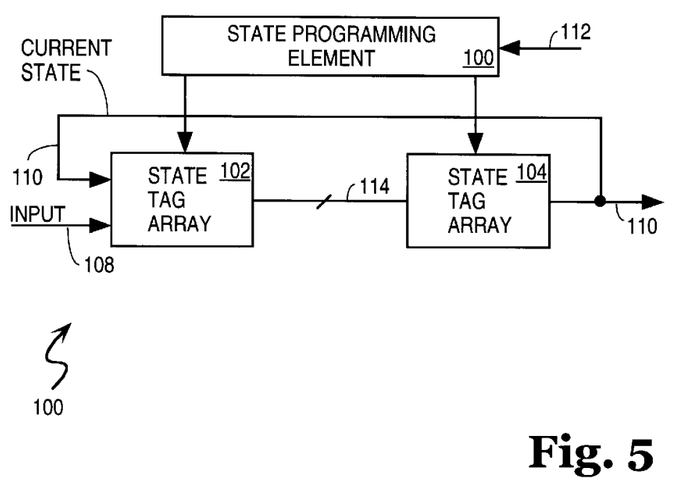
FIG. 5 is a block diagram of a cache-like programmable state machine configured in accordance with the invention.

FIG. 5 illustrates a programmable state machine 100 having a tag array 102, a new state array 104, and a programming element 106. Tag array 102 includes one entry for each permissible combination of input values received along line 108 and current state values received along line 110. New state array 104 includes the new state corresponding to each entry in the tag array. Hence, together, the tag array and the new state array represent every permissible transition within a system represented by the overall state machine. Programming element 106, which is connected to both tag array 102 and new state array 104, receives alternative state information along an input line 112 for use in reprogramming the tag array and new state array to represent a different system. The manner by which the programming element reprograms the tag array and the new state array depends upon the manner by which the tag array and new state array are configured. In one example, the arrays are configured using flash-programmable memory elements and programming element 106 includes components for programming or setting the individual flash elements of the arrays. In general, the programming element may be a separate component of a single integrated circuit employing the programmable state machine or may represent a separate component or apparatus which is mounted to the integrated circuit only when reprogramming is necessary.

The alternative state information received by the programming element for use and reprogramming the state machine may represent the states of an entirely different system or may merely represent improvements, modifications or bug-fixes to a system previously programmed. For example, the programmable state machine may initially be programmed to represent the states of a bus protocol system. The alternative state information may represent a modified or improved version of the bus protocol, an entirely different bus protocol, or a non-bus protocol system. Also, depending upon the implementation, the programming element may be configured to adaptively modify the state information contained within the tag array and the new state array to optimize functioning of the overall system, perhaps based on external factors or upon a measured performance value of all the system.

Thus, the programmable state machine of the invention may be reprogrammed in any of the variety of ways to achieve a variety of results. The remainder of the description will focus primarily on the configuration of the tag entry array and the new state array and not on the manner of, or purposes behind, reprogramming of the state machine.

In use, tag array 102 receives a binary representation of the current system state along line 110 and a binary representation of input signals, which may include reset signals, along line 108. Tag array 102 includes an entry for each permissible combination of bit patterns received along lines 108 and 110. The tag array compares the bit patterns received along lines 108 and 110 with the stored bit patterns of the tag entries to determine which tag entry matches the input patterns. Once a match is detected, a hit signal identifying the particular tag entry, is transmitted along hit line 114 to new state array 104. The state array stores a bit pattern representing the new state corresponding to each of the entries of the tag array. Based upon the hit signal received, the new state array outputs the corresponding new state along line 110 for use by external components (not shown). The new state is also transmitted to the tag array along line 110 for use in determining the next state. Depending upon the implementation, a new state may be determined at each clock cycle of a clock signal (not shown). It should be noted that, in some circumstances, the new state will be the same as the previous state.

Thus, the tag array and the new state array only store values corresponding to permissible transitions which, for most practical systems, is only a fraction of the total number of possible transitions. For example, for use with a system having N states and $N^2$ possible transitions but only 3N actual permissible transitions, the tag array and new state array store only the 3N permissible transitions. To accommodate a variety of possible systems, the tag array and new state array are preferably configured with sufficient storage locations to accommodate 4N or 5N transitions. For example, the tag array and new state array may both be configured to store 250 or 300 possible transitions. For most practical systems, such is sufficient to accommodate a 64 state system. Of course, such may also accommodate a system having many more possible states, so long as the total number of permissible transitions does not exceed the amount of storage space actually provided. It should be noted that, with 256 entries per array, the programmable state machine can accommodate a 16-state system wherein all possible transitions are also permissible transitions.

As a specific example, for the 3-bit counter of FIG. 4, the tag array and the new state array both store 16 entries corresponding to the 16 permissible transitions described above in connection with FIG. 4. If the tag array and state array are configured with a greater number of storage spaces, then any unused storage spaces remain empty.

Table 1 illustrates the specific entries stored within the tag array and the new state array for the example of 3-bit counter.

TABLE 1

| CURRENT STATE | INPUT (RESET) | NEW STATE |
| --- | --- | --- |
| 000 | 0 | 001 |
| 001 | 0 | 010 |
| 010 | 0 | 011 |
| 011 | 0 | 100 |
| 100 | 0 | 101 |
| 101 | 0 | 110 |
| 110 | 0 | 111 |
| 111 | 0 | 000 |
| 000 | 1 | 000 |
| 001 | 1 | 000 |
| 010 | 1 | 000 |
| 011 | 1 | 000 |
| 100 | 1 | 000 |
| 101 | 1 | 000 |
| 110 | 1 | 000 |
| 111 | 1 | 000 |

Within Table 1, a reset value of 1 indicates a positive reset and a reset value of 0 indicates no reset. Accordingly, when no reset signal is received, the 3-bit counter sequentially counts from 000 to 111, then repeats. When a reset signal is received, the counter returns to the 000 state. As noted, only permissible state transitions are set forth in the arrays. Thus, for example, because the transition from a 111 state to a 110 state is not permissible, no such entry is provided. This is in contrast with a RAM-based programmable state machine which would include one entry for all possible, although not necessarily permissible, transitions.

Thus, Table 1 illustrates the values stored for a simple 3-bit counter. Of course, in practical implementations, a more complex sequence of current states input values and new states are represented, with the input signal perhaps being represented by an entire string of bits. Nevertheless, all permissible combinations of current states and input states are represented along with their corresponding new state.

Figure 6:
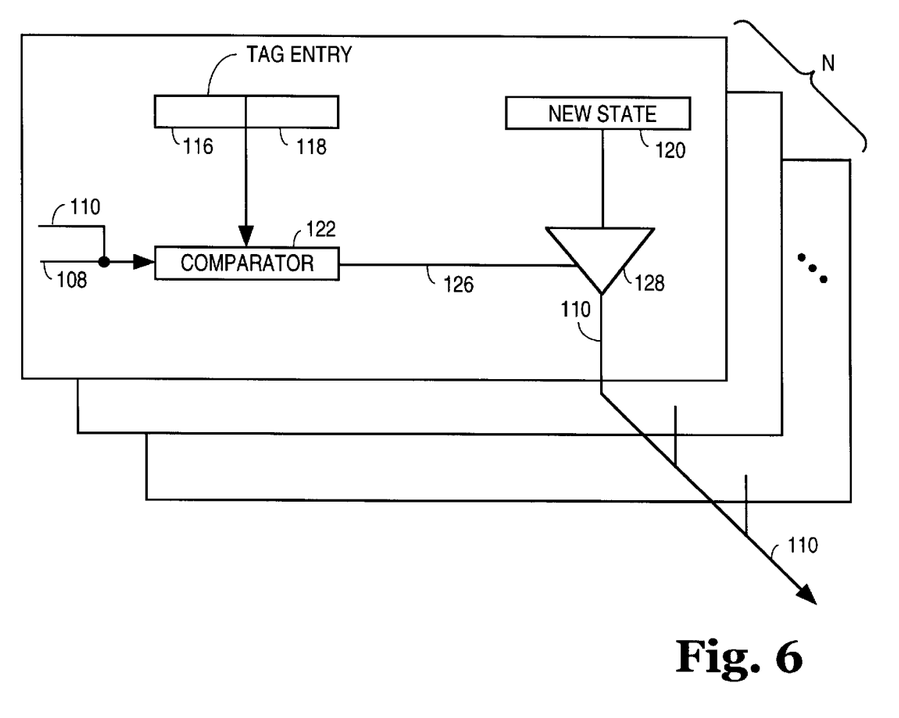
FIG. 6 is a block diagram of a portion of the state machine of FIG. 5, particularly illustrating one entry of a tag array and a single corresponding entry of a new state array.

FIG. 6 illustrates a first exemplary implementation of the programmable state machine of FIG. 5 configured similarly to a fully associative cache. More specifically, FIG. 6 illustrates one entry of the tag array and its corresponding entry within the state array for a state machine capable of accommodating N permissible transitions. Each "line" of the array includes a tag array element 114 storing a unique combination of a current state value 116 and an input value 118. The corresponding new state is stored within state array element 120. In use, the current state and input values are received along line 108 by a comparator 122 which also receives the stored values from tag array 114 along line 124. If the values match identically, comparator 122 outputs a positive hit signal along line 126 to a tristate buffer 128 which outputs the new state value from entry 120 along output line 110. If the comparator does not detect the match, then no hit signal is transmitted along line 126, and tristate buffer 128 is not activated to output the corresponding new state. In such a circumstance, however, one of the other lines of the tag array will detect the match and will output the corresponding new state. At each clock cycle, one, and only one, of the lines of the tag array outputs a hit signal causing one, and only one, new state to be output along line 110. The comparison of input values to tag array values is performed simultaneously for all lines of the tag array. However, in other implementations, a comparison may be performed sequentially or in some other manner.

Figure 7:
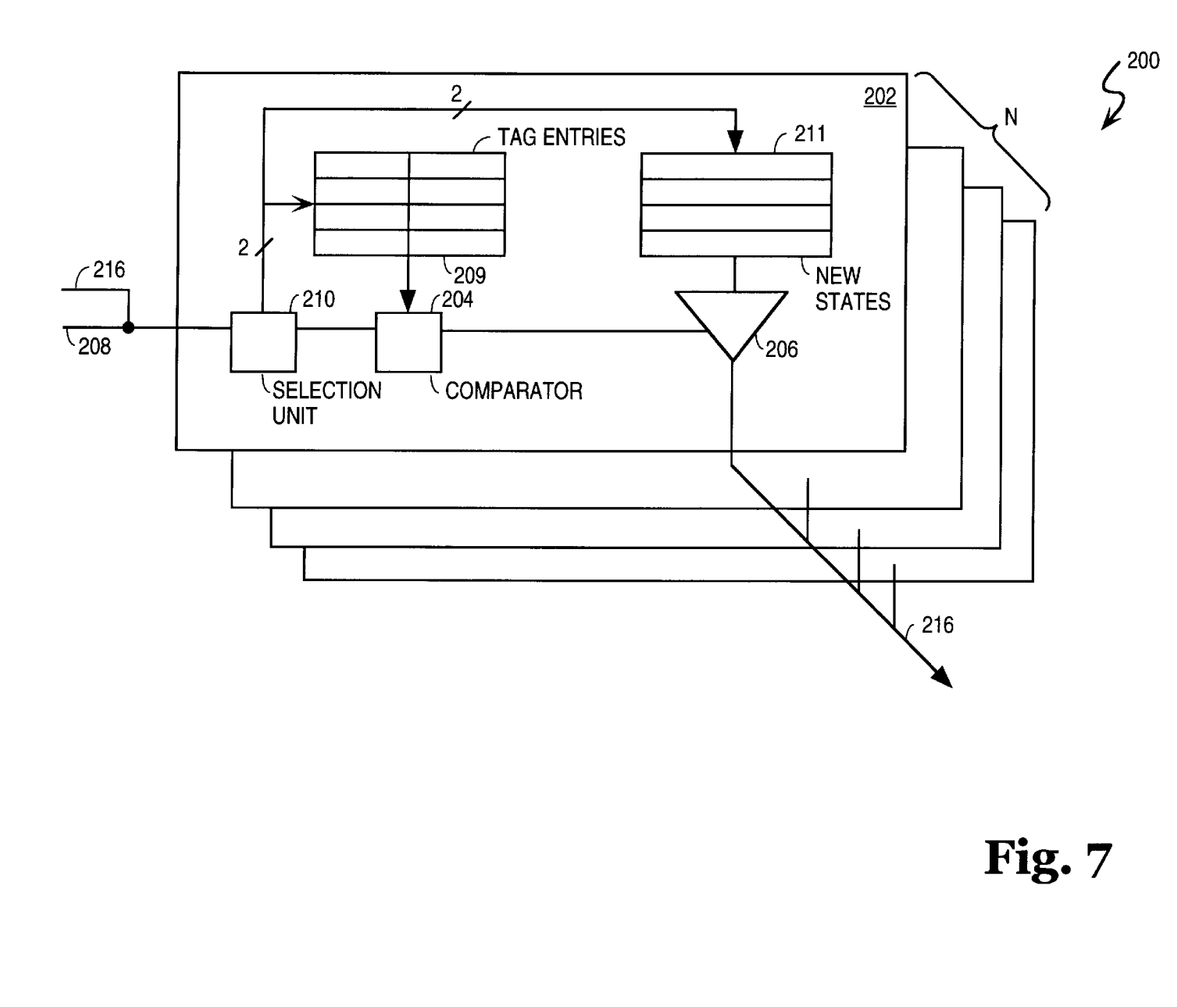
FIG. 7 is a block diagram of a first alternative embodiment of the programmable state machine of FIG. 5, employing a 4-way set-associative cache-like arrangement.

FIG. 7 illustrates an alternative implementation wherein the tag array and new state array are implemented similarly to N-way set associative cache. Whereas the fully associative configuration of FIG. 6 provides a comparator and tristate buffer for each tag entry and corresponding new state, the arrangement of FIG. 7 provides one comparator and one tristate buffer for four tag entries and corresponding new states. More specifically, programmable state machine 200 of FIG. 7 includes N sets 202 each having a comparator 204 and a tristate buffer 206 and each having a set of four tag entries 208 and corresponding new state entries 210. Input values and current state values are received along an input line 208 by a selection unit 210 which outputs a 2-bit signal along line 212 for selecting one of the four tag entries and four new state entries. The 2-bit value is based upon the highest 2 bits of the received current state and input value bit pattern. In other implementations, however, the selection of the 2 bits may be more complicated and may, for example, be optimized to provide the most efficient selection of entries based upon the fact that state information is stored, rather than conventional cached data.

Comparator 204 receives a current state and input values corresponding to one of the four entries and compares those values with the current state and input values received along line 214 from selection unit 210. In the exemplary implementation where the two most significant bits are transmitted along line 212, line 214 transmits only the remaining bits. Tag array elements 208 does not store the two most significant bits.

If the current state and input values received along line 208 match any of the entries within tag array entry set 209, a hit signal is transmitted from comparator 204 to tristate buffer 206 for outputting the corresponding new state from new state set array 211 along output line 216.

As with the arrangement of FIG. 6, all permissible combinations of current states and input values are represented in one, and only one, tag entry within the overall array such that one, and only one, new state is output along line 216. The set associative arrangement of FIG. 7 requires less overall silicon space for implementation, primarily because fewer comparators and tristate buffers are required. Other cache-like arrangements, corresponding to other types of cache systems may alternatively be employed consistent with the principles of the invention.

Figure 8:
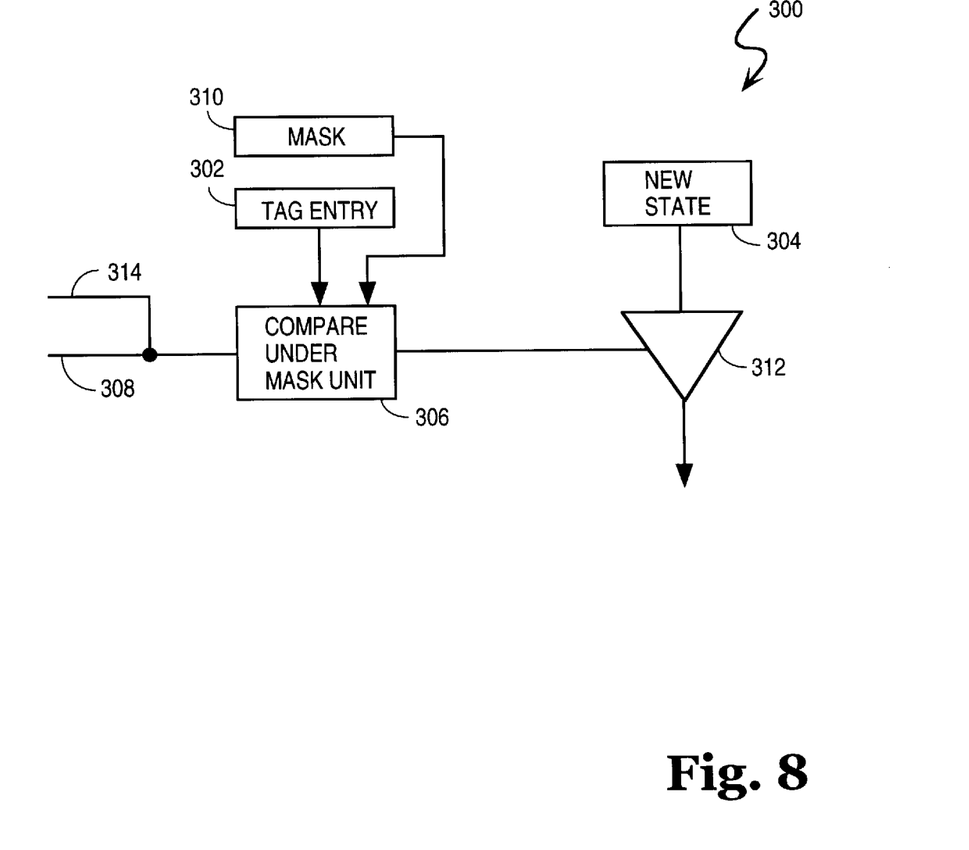
FIG. 8 is a block diagram of a second alternative arrangement of the state machine of FIG. 5 for performing a "compare under mask".
Figure 9:
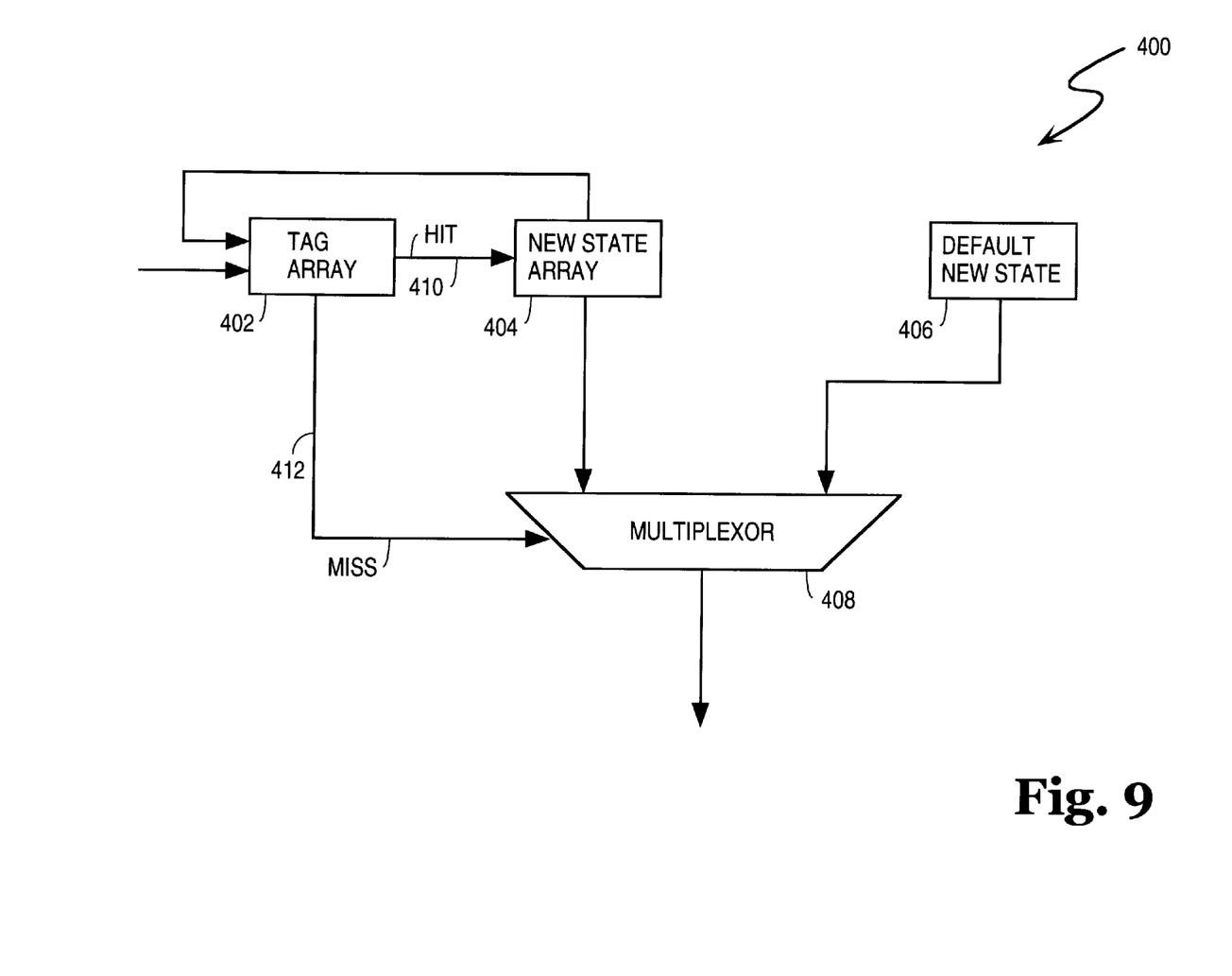
FIG. 9 is a block diagram of a third alternative embodiment of the programmable state machine of FIG. 5 providing a default new state in response to a miss detected by the tag array.

As noted, within the embodiments of FIGS. 6 and 7, each permissible transition has a corresponding tag entry and a corresponding new state entry. As a result, for at least some systems, many of the new state entries will store redundant states. For example, in the 3-bit counter example, set forth in Table 1, nine of the new state entries all correspond to the same "000" state. The remaining Figures illustrate embodiments which, at least partially, eliminate the storage of redundant states. In the embodiments of FIGS. 8 and 9, a "compare under mask" technique is employed to eliminate such redundancies.

Referring first to FIG. 8, a single entry 300 of a programmable state machine is illustrated, otherwise configured with a fully associative cache-like arrangement such as shown in FIG. 6. Entry 300 includes a tag entry 302 and a corresponding new state entry 304. A "compare under mask" element 306 receives current state and input values along input line 308, the values of tag entry 302 and a mask value from a mask entry 310. The "compare under mask" element compares the current state and input values with the values of entry 302 subject to any masking values supplied by masking entry 310. If a match occurs, a hit signal is transmitted to a tristate buffer 312 which outputs the corresponding new state from entry 304 along output line 314.

The masking value may be set to mask out portions of the current state or input value bit pattern for an entire set of such inputs which all correspond to a single new state. For example, in the 3-bit counter of Table 1, new state "000" corresponds with all input states when the input reset value is 1. Accordingly, a single entry may be provided to represent all eight transitions. More specifically, a single entry or "line" is provided wherein the tag entry is "1111" and the mask entry is "111X". Hence, when the mask is applied to the current state and input value bit patterns received along line 308, the actual current state is masked and replaced by "111". Only the fourth bit, representing the reset bit, is unmasked. Accordingly, a match is detected if the reset value is 1, regardless of the current state, and no match is detected otherwise.

In this manner, the eight redundant states corresponding to a reset condition are represented by a single tag entry and the overall tag array requires only nine entries, rather than sixteen. Thus, the use of a mask allows one entry to represent an entire set of possible transitions, each to the same new state. The mask may also be employed to allow arbitrary or "don't care" input patterns to be ignored depending upon the current state of the machine, which is typical behavior for many practical state machines.

The "compare under mask" element may be configured in accordance with the variety of techniques. As one example, the compare under mask element may include a set of XOR and AND elements for each bit of the bit patterns to be compared with the mask. The XOR element receives the Nth bit of the current state and input value bit pattern and the Nth bit of the tag entry bit pattern. The Nth element receives an output from the XOR element and also receives the Nth bit of the mask entry. With such a configuration, the overall output signal of the AND element is 0 if the mask bit is 0 or if the tag bit and input bit are equal. The output value is 1, if the mask bit is 1 and the bit of the input bit pattern matches the bit of the tag entry string. The output of each of the sets of logic gates are combined using a multiple input OR gate resulting in an overall output value of 0 if the "compare under mask" is a hit and a 1 otherwise.

FIG. 9 illustrates an embodiment wherein numerous redundant new states are represented a single default state. More specifically, FIG. 9 illustrates a programmable state machine 400 having a tag array 402, a new state array 404, a default element 406 and a multiplexer 408. Tag array 402 compares current state and input values with tag entries and generates a hit signal if a match is detected and a miss signal otherwise. The hit signal is transmitted along line 410 to new state array 404 which outputs the corresponding new state. The miss signal is transmitted along a line 412 to multiplexer 408 which controls the multiplexer to output a default new state from default entry 406 for a miss and the new state value from array 404 for a hit.

With the example of the 3-bit counter of Table 1, the default entry represents the state "000". The new state array stores only all other new states, i.e., states "001" to "111". Tag entry array 402 stores the corresponding combinations of current states and input values causing transitions to states "001" to "111". Hence, the tag entry array and the new state array store only seven entries. If a match is not detected among the seven entries of tag array, the miss signal causes the multiplexer to output the default state of "000". Hence, the redundancy of the common "000" states is conveniently eliminated. Indeed, not only are fewer entries required, but for the 3-bit counter example, the tag array entries need to store only the 3-bit current states and need not store the input (reset) value which is "0" for all transitions stored in the tag array.

Hence, various embodiments of the programmable state machine of the invention have been described. Particular implementations may correspond with these or other embodiments. Indeed, some embodiments may employ combinations of the various techniques described herein. For example, an embodiment may utilize a default value to represent some transition states and a mask value to represent others. In general, the exemplary embodiments described herein are merely illustrative of principles of the invention and should not be construed as limiting the scope of the invention.

What is claimed is:

1. A software programmable state machine for representing a system having N states that corresponds to $N^2$ possible transitions, wherein said N is an integer, said state machine comprising:

a tag array means for selectively storing a subset of said $N^2$ possible transitions corresponding to permissible transitions, each of said permissible transition having a permissible combination of a current state and a current input value, said tag array means storing each permissible combination of current states and current input values in respective tag array elements;

a next state array means, connected to the tag array means, for storing a next state associated with each combination of current states and current input values within the tag array in respective next state array elements;

a mask entry for providing a mask value; and means for comparing current state and current input values with values stored in the tag array means as masked by said mask value and for controlling the next state array means to output the next state corresponding to the tag array element for which the current state and current input values match the tag array element current state and current input condition values.

2. The state machine of claim 1 wherein the means for comparing comprises an individual comparator means, connected to each tag array entry and to input Lines receiving current state and current input value signals, for generating a hit signal in response to a detected match; and a tristate buffer means, connected to the corresponding next state array element and to the comparator, for receiving the hit signal and for outputting the next state from the data array element in response to the hit signal.

3. The state machine of claim 2 wherein the individual comparator means is a comparator.

4. The state machine of claim 2 wherein the tribuffer means is a tristate buffer.

5. The state machine of claim 1 wherein the tag array means and the next state array means are both storage arrays sub-divided into N subsets having M possible ways.

6. The state machine of claim 1 wherein the comparing means includes means for comparing the current state and current input values with the tag array values and with the mask values and for generating a hit signal if an exclusive -OR combination of the current state and current input values and the tag array values match the mask values or if the mask values are all zero and a miss signal if at least one of the mask values is one and the current state and current input value signals match the tag array a values.

7. The state machine of claim 1 further including means for outputting a default next state value if the current state and current input values do not match any of the values of the tag entry array means.

8. The state machine of claim 7 wherein the means for outputting a default next state value is a default entry in a default element.

9. The state machine of claim 1 wherein the tag array means and the next state array means are configured as arrays using programmable logic elements.

10. The state machine of claim 9 wherein the programmable logic elements are flash memory elements.

11. The state machine of claim 9 wherein the programmable logic elements are EFROM elements.

12. The state machine of claim 1 wherein the tag array means and the next state array means are arrays configured using ROM.

13. The programmable state machine of claim 1 wherein said tag array and a next state array store values corresponding to at least 3N permissible transitions out of a total $N^2$ possible transitions wherein N is a natural number corresponding to a number of states.

14. The state machine of claim 1 wherein the means for comparing is a comparator.

15. The state machine of claim 1 wherein the mask means is a mask entry in a mask element.

16. A software programmable state machine for representing a system having N states that corresponds to $N^2$ possible transitions, wherein said N is an integer, said state machine comprising:

a tag array for selectively storing a subset of said $N^2$ possible transitions corresponding to permissible transitions, each of said permissible transition having a permissible combination of a current states and current input value, said tag array storing each permissible combination of current states and current input values in respective tag array elements;

a next state array, connected to the tag array, for storing a next state associated with each combination of current states and current input values within the tag array in respective next state array elements;

a mask means for providing a mask value; and a comparison element for comparing current state and current input values with values stored in the tag array as masked by said mask value and for controlling the next state array to output the next state corresponding to the tag array element for which the current state and current input values match the tag array element current state and current input condition values.

17. The state machine of claim 16 wherein the comparison element comprises an individual comparator connected to each tag array entry and to input lines receiving current state and current input value signals, said comparator generating a hit signal in response to a detected match; and a tristate buffer connected to the corresponding next state array element and to the comparator, for receiving the hit signal and for outputting the next state from the next state array element in response to the hit signal.

18. The state machine of claim 16 wherein the tag array and the data array are both sub-divided into N subsets having M possible ways.

19. The state machine of claim 16 wherein the comparison element includes elements for comparing the current state and current input values with the tag array values and with the mask values and for generating a hit signal if an exclusive -OR combination of the current state and current input values and the tag array values match the mask values or if the mask values are all zero and a miss signal if at least one of the mask values is one and the current state and current input value signals match the tag array a values.

20. The state machine of claim 16 further including an output element for outputting a default next state value if the current state and current input values do not match any of the values of the tag entry array.

21. The state machine of claim 16 wherein the tag array and the data array are configured using programmable logic elements.

22. The state machine of claim 21 wherein the programmable logic elements are flash memory elements.

23. The state machine of claim 21 wherein the programmable logic elements are EPROM elements.

24. The state machine of claim 16 wherein the tag array and the data array are configured using ROM.

* * * * *

UNITED STATES PATENT AND TRADEMARK OFFICE
CERTIFICATE OF CORRECTION

PATENT NO. : 5,905,902
DATED : May 18, 1999
INVENTOR(S) : O'Connor

It is certified that error appears in the above-identified patent and that said Letters Patent is hereby corrected as shown below:

Column 10,
Line 13, delete "EFROM" and insert -- EPROM --.

Column 11,
Line 6, delete "a".

Signed and Sealed this

Twenty-seventh Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 5,905,902
DATED : May 18, 1999
INVENTOR(S) : O'Connor

It is certified that error appears in the above-identified patent and that said Letters Patent is hereby corrected as shown below:

Column 7,
Line 54, after "redundancies", insert -- In the embodiment of Figures 10 and 11, a default-value bypass is employed --.

Signed and Sealed this

Twenty-first Day of September, 2004

JON W. DUDAS
*Director of the United States Patent and Trademark Office*